United States Patent
Katsavounidis (10) Patent No.: US 11,257,183 B1
(45) Date of Patent: Feb. 22, 2022

(54) SYSTEMS AND METHODS FOR HARDWARE ACCELERATION OF RESAMPLING OPERATIONS

(71) Applicant: Facebook, Inc., Menlo Park, CA (US)

(72) Inventor: Ioannis Katsavounidis, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 324 days.

(21) Appl. No.: 16/589,034

(22) Filed: Sep. 30, 2019

(51) Int. Cl.
*G06T 3/40* (2006.01)
*G06F 9/50* (2006.01)
*G06F 17/16* (2006.01)
*G06K 9/62* (2022.01)

(52) U.S. Cl.
CPC .............. *G06T 3/40* (2013.01); *G06F 9/5027* (2013.01); *G06F 17/16* (2013.01); *G06K 9/6218* (2013.01)

(58) Field of Classification Search
CPC ......... G06T 3/40; G06F 9/5027; G06F 17/16; G06K 9/6218
See application file for complete search history.

(56) References Cited

U.S. PATENT DOCUMENTS

| | | | | |
|---|---|---|---|---|
| 6,167,414 A * | 12/2000 | Schwartz | ................ | G06T 5/004 708/300 |
| 8,319,855 B2 * | 11/2012 | Yang | .................. | H04N 5/23229 348/222.1 |
| 9,795,364 B2 * | 10/2017 | Osumi | .................... | G16H 50/20 |
| 2004/0145501 A1 * | 7/2004 | Hung | .................... | G06T 3/4023 341/61 |
| 2012/0275724 A1 * | 11/2012 | Wakazono | ................ | G06T 3/40 382/298 |
| 2018/0042565 A1 * | 2/2018 | Wilson | .................... | A61B 6/504 |
| 2019/0362467 A1 * | 11/2019 | Lee | .................... | G06K 9/00536 |
| 2020/0302224 A1 * | 9/2020 | Jaganathan | ............. | G06F 16/58 |

OTHER PUBLICATIONS

Turkowski, Ken, "Filters for Common Resampling Tasks", Graphics Gems I, Academic Press, Apr. 10, 1990, pp. 1-14.
Sachs, Jonathan, "Image Resampling", URL: http://www.dl-c.com/Temp/downloads/Whitepapers/Resampling.pdf, 2001, pp. 1-14.
Stack Overflow, "what is the idea behind scaling an image using lanczos?", URL: https://stackoverflow.com/questions/1854146/what-is-the-idea-behind-scaling-an-image-using-lanazos, as accessed on Jun. 13, 2019, pp. 1-5.
Wikipedia, "Lanczos resampling", URL: https://en.wikipedia.org/w/index.php?title=Lanczos_resampling&oldid=887426730, as accessed on Sep. 30, 2019, 5 pages.

* cited by examiner

*Primary Examiner* — Fayyaz Alam
(74) *Attorney, Agent, or Firm* — FisherBroyles, LLP (57) ABSTRACT

The disclosed computer-implemented method may include determining a set of filter vectors. Each filter vector in the set of filter vectors may include a set of filter weights associated with at least one portion of an output volume of a resampling operation. The method may also include generating, via a clustering algorithm and based on the set of filter vectors, a filter bank for the resampling operation. The filter bank may include an additional set of filter vectors. The method may further include (1) transmitting the filter bank to a memory module included in a hardware accelerator, and (2) directing the hardware accelerator to execute the resampling operation using an input volume and the filter bank. Various other methods, systems, and computer-readable media are also disclosed.

20 Claims, 7 Drawing Sheets

SYSTEMS AND METHODS FOR HARDWARE ACCELERATION OF RESAMPLING OPERATIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Some high-quality image resampling techniques (e.g., Lanczos resampling, bicubic resampling, etc.) may involve convolving a filter function with a set of input pixel values to determine a set of output pixel values. In some examples, these image resampling techniques may include filter functions and/or filter windows that may include many filter coefficients. For example, when downsampling an image by a factor of three (e.g., 1920 pixels×1080 pixels to 640 pixels by 360 pixels) using a Lanczos filter with an alpha parameter of five (e.g., α=5), the filter may produce, include, and/or require $$2 \times \alpha \times \left(\frac{1920}{640}\right) = 30$$

filter coefficients per output pixel value. These filter coefficients may be convolved (e.g., multiplied and summed) with a corresponding set of input pixel values to determine an output pixel value.

In examples where arbitrary sampling ratios may be desired, nearly every output pixel location may have a unique set of filter coefficients. For example, when resampling an input image having a width of 1000 pixels to an output image having a width of 999 pixels, almost every output pixel location (e.g., 999 pixel locations) may have a unique set of filter coefficients. Storing, maintaining, and/or utilizing such lengthy filters may result in very large memory requirements. Although such memory requirements may not generally be an issue with software implementations of such resampling operations, they may be prohibitively large for hardware-accelerated implementations of such resampling operations. Hence, the instant application identifies and addresses a need for improved apparatuses, systems, and methods of hardware acceleration of resampling operations.

The present disclosure is generally directed to apparatuses, systems, and methods for hardware acceleration of resampling operations. As will be explained in greater detail below, embodiments of the instant disclosure may determine a set of filter vectors. Each filter vector in the set of filter vectors may include a set of filter weights associated with at least one portion of an output volume of a resampling operation. Additionally, an embodiment may generate, via a clustering algorithm and based on the set of filter vectors, a filter bank for the resampling operation. The filter bank may include an additional set of filter vectors, such as filter vectors representing and/or associated with one or more centroids of clusters of the set of filter vectors generated via the clustering algorithm. An embodiment may also transmit the filter bank to a memory module included in a hardware accelerator and may direct the hardware accelerator to execute the resampling operation using an input volume and the filter bank.

By considering all possible sets of filter coefficients (e.g., filter weights) for a resampling operation as vectors (e.g., filter vectors), the systems and methods described herein may use a clustering algorithm (e.g., a k-means clustering algorithm, a mean-shift clustering algorithm, a hierarchical clustering algorithm, etc.) to generate a filter bank that may include a reduced number of filter coefficients, but that introduces only a small error to the resampling operation.

To illustrate, continuing with the example above, embodiments of the systems and methods described herein may reduce a comparatively large number of sets of filter weights (e.g., 999 sets of filter weights as noted above in an earlier example) to a smaller, representative number of filter weights (e.g., 128 sets of filter weights). A hardware accelerator with limited memory availability may use this representative set of filter weights (along with an optional index that may associate each filter vector included in the filter bank with at least one segment of the output volume) to execute the resampling operation.

Because the systems and methods described herein may determine the filter bank via a clustering algorithm (e.g., by quantizing the filter vectors into a smaller set of representative filter vectors, such as a set of centroid vectors produced from the set of filter vectors via the clustering algorithm), embodiments of the systems and methods described herein may introduce only a small amount of error versus software implementations of the resampling operation (i.e., implementations with greater memory availability). Such embodiments may simultaneously achieve many benefits of offloading the computationally intensive resampling operation from a general-purpose processing unit (e.g., a central processing unit) to a specialized hardware accelerator, such as increased speed of execution of the resampling operation, power efficiency, increased central processing unit availability, and so forth.

The following will provide, with reference to FIGS. 1-2 and 4-6, detailed descriptions of systems for hardware acceleration of resampling operations. Detailed descriptions of corresponding computer-implemented methods will also be provided in connection with FIGS. 3 and 7.

Figure 1:
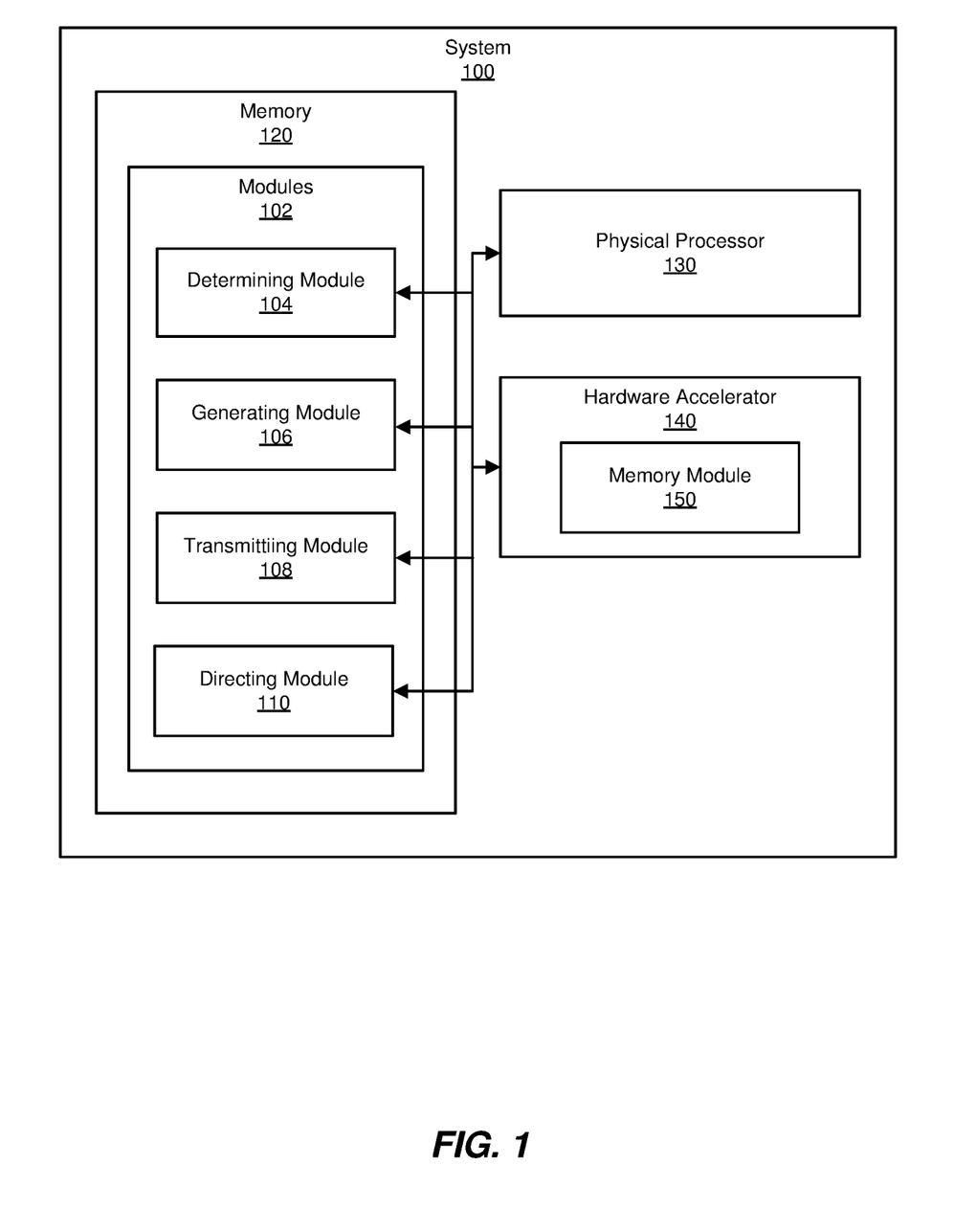
FIG. 1 is a block diagram of an example system for hardware acceleration of resampling operations.

FIG. 1 is a block diagram of an example system 100 for hardware acceleration of resampling operations. As illustrated in this figure, example system 100 may include one or more modules 102 for performing one or more tasks. As will be explained in greater detail below, modules 102 may include a determining module 104 that may determine a set of filter vectors, each filter vector in the set of filter vectors including a set of filter weights associated with at least one portion of an output volume of a resampling operation. Example system 100 may additionally include a generating module 106 that may generate, via a clustering algorithm and based on the set of filter vectors, a filter bank for the resampling operation that may include an additional set of filter vectors.

As also illustrated in FIG. 1, example system 100 may additionally include a transmitting module 108 that may transmit the filter bank to a memory module included in a hardware accelerator. Furthermore, example system may also include a directing module 110 that may direct the hardware accelerator to execute the resampling operation using an input volume and the filter bank.

In some examples, a "resampling operation" and/or a "filtering operation" may include any operation that may adjust (increase and/or decrease) a sampling rate of a digital signal and/or shift the sampling rate of the digital signal by a fraction of a sampling interval. In some examples, a resampling operation may be used for interpolation (e.g., multivariate interpolation) of an input volume, such as to resize and/or rotate a digital image. Examples of resampling operations may include, without limitation, a bicubic resampling operation, a Sinc resampling operation, a Lanczos resampling operation, and so forth. Examples and illustrations of resampling operations will be provided below in reference to FIG. 4.

In some examples, a "filter vector" may include any data structure that may represent a set of filter coefficients that may be associated with application of a resampling operation to an input volume and/or an output volume. For example, a filter vector may include and/or represent a set of filter coefficients that may be applied in a convolution of a filter (e.g., a kernel) associated with a resampling operation (e.g., a Lanczos kernel, a bicubic kernel, etc.) with a portion of an input volume (e.g., an input image) to determine a portion of an output volume (e.g., an output image). Examples and illustrations of filter vectors will be provided below in connection with FIG. 4.

In some examples, a "clustering algorithm" may include any method or process that groups a set of objects in such a way that objects in the same group (e.g., cluster) are more similar in some sense to each other than to those in other groups (e.g., clusters). Examples of clustering algorithms may include, without limitation, a k-means clustering algorithm, a mean-shift clustering algorithm, a hierarchical clustering algorithm, an expectation—maximization algorithm, and so forth. Examples and illustrations of filter vectors will be provided below in connection with FIG. 4.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As additionally illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate hardware acceleration of resampling operations. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 may also include a hardware accelerator 140. In some examples, a "hardware accelerator" may include a hardware component or device that performs one or more specialized computing tasks more efficiently, in hardware, than the computing task would be performed in software by a general-purpose CPU (i.e., a computing chip that is structured to execute a range of different programs as software). In some examples, "hardware acceleration" may include the execution of a computing task in application-specific hardware circuitry that occurs in the absence of a software module intermediary or other layer of abstraction, such that the performance of the application is more efficient (e.g., in terms of computing resources, electrical resources, etc.) than when executed otherwise (e.g., by a general-purpose CPU).

In at least one example, hardware accelerator 140 may include application-specific hardware circuitry designed to perform a specific computing task. In some examples, hardware accelerator 140 may be designed to offload a portion of the specific computing task from a CPU of a computing device, such as a data center server, by executing, via application-specific hardware circuitry, at least a portion of the specific computing task. In some examples, to "offload a portion of the computing task from a CPU of a computing device" may include performing the computing task through the hardware accelerator rather than performing the computing task through a general-purpose CPU (i.e., a CPU of the computing device to which hardware accelerator 140 is coupled, or another CPU that might otherwise perform the computing task in the absence of hardware accelerator 140).

As also shown in FIG. 1, hardware accelerator 140 may include at least one memory module 150. Memory module 150 generally represents any type or form of volatile or non-volatile storage device or medium capable of storing data and/or computer-readable instructions for the use of one or more components of hardware accelerator 140. In some examples, memory module 150 may store, load, and/or maintain one or more portions of data for use by one or more portions of hardware accelerator 140 (e.g., application-specific hardware circuitry configured to perform at least a portion of a specific computing task). In some examples, memory module 150 may exclude or omit data not intended for use by one or more portions of hardware accelerator 140. In some examples, memory module 150 may be physically coupled to one or more application-specific hardware circuitry designed to perform a specific computing task and included in hardware accelerator 140. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable memory device.

Figure 2:
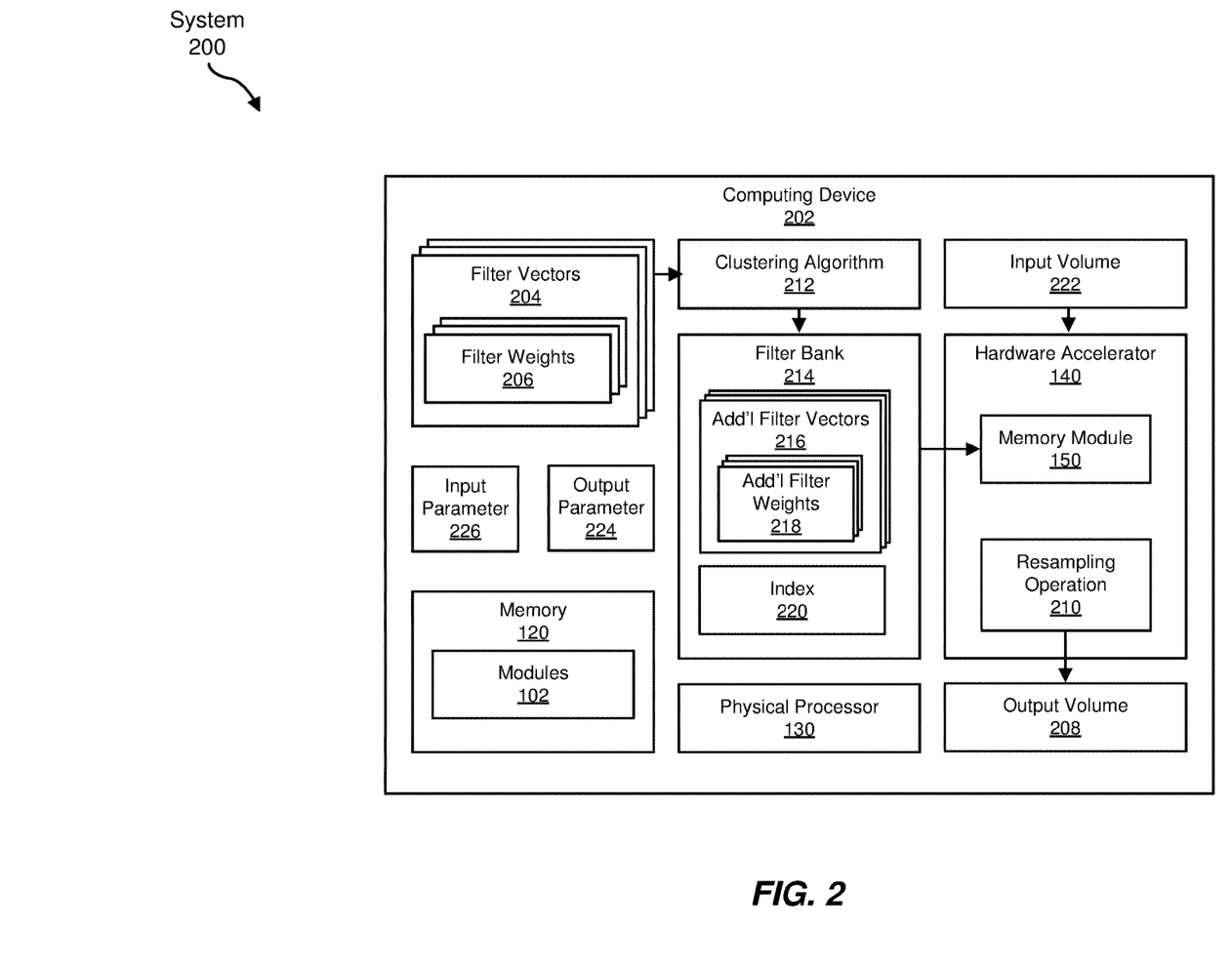
FIG. 2 is a block diagram of an example implementation of a system for hardware acceleration of resampling operations.

Example system 100 in FIG. 1 may be implemented in a variety of ways. For example, all or a portion of example system 100 may represent portions of an example system 200 ("system 200") in FIG. 2. As shown in FIG. 2, system 200 may include computing device 202. In at least one example, computing device 202 may be programmed with one or more of modules 102.

In at least one embodiment, one or more modules 102 from FIG. 1 may, when executed by computing device 202, enable computing device 202 to perform one or more operations to facilitate hardware acceleration of resampling operations. For example, as will be described in greater detail below, determining module 104 may cause computing device 202 to determine a set of filter vectors (e.g., filter vectors 204). Each filter vector in the set of filter vectors may include a set of filter weights (e.g., filter weights 206) associated with at least one portion of an output volume (e.g., output volume 208) of a resampling operation (e.g., resampling operation 210).

Additionally, generating module 106 may cause computing device 202 to generate, via a clustering algorithm (e.g., clustering algorithm 212) and based on the set of filter vectors, a filter bank (e.g., filter bank 214) for the resampling operation. The filter bank may include an additional set of filter vectors (e.g., additional filter vectors 216 that may include additional filter weights 218). In some examples, generating module 106 may further generate an index (e.g., index 220) of the filter bank that associates each filter vector included in the filter bank with at least one segment of the output volume.

Furthermore, transmitting module 108 may cause computing device 202 to transmit the filter bank to a memory module (e.g., memory module 150) included in a hardware accelerator (e.g., hardware accelerator 140). Moreover, directing module 110 may cause computing device 202 to direct the hardware accelerator to execute the resampling operation using an input volume (e.g., input volume 222) and the filter bank.

In some examples, one or more of modules 102 (e.g., determining module 104) may also receive an output parameter (e.g., output parameter 224) and/or an input parameter (e.g., input parameter 226) for the resampling operation, such as an output resolution of an output image, a resampling factor for the resampling operation, and/or an input resolution of an input image.

Computing device 202 generally represents any type or form of computing device capable of reading and/or executing computer-executable instructions. Examples of computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to facilitate hardware acceleration of resampling operations.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
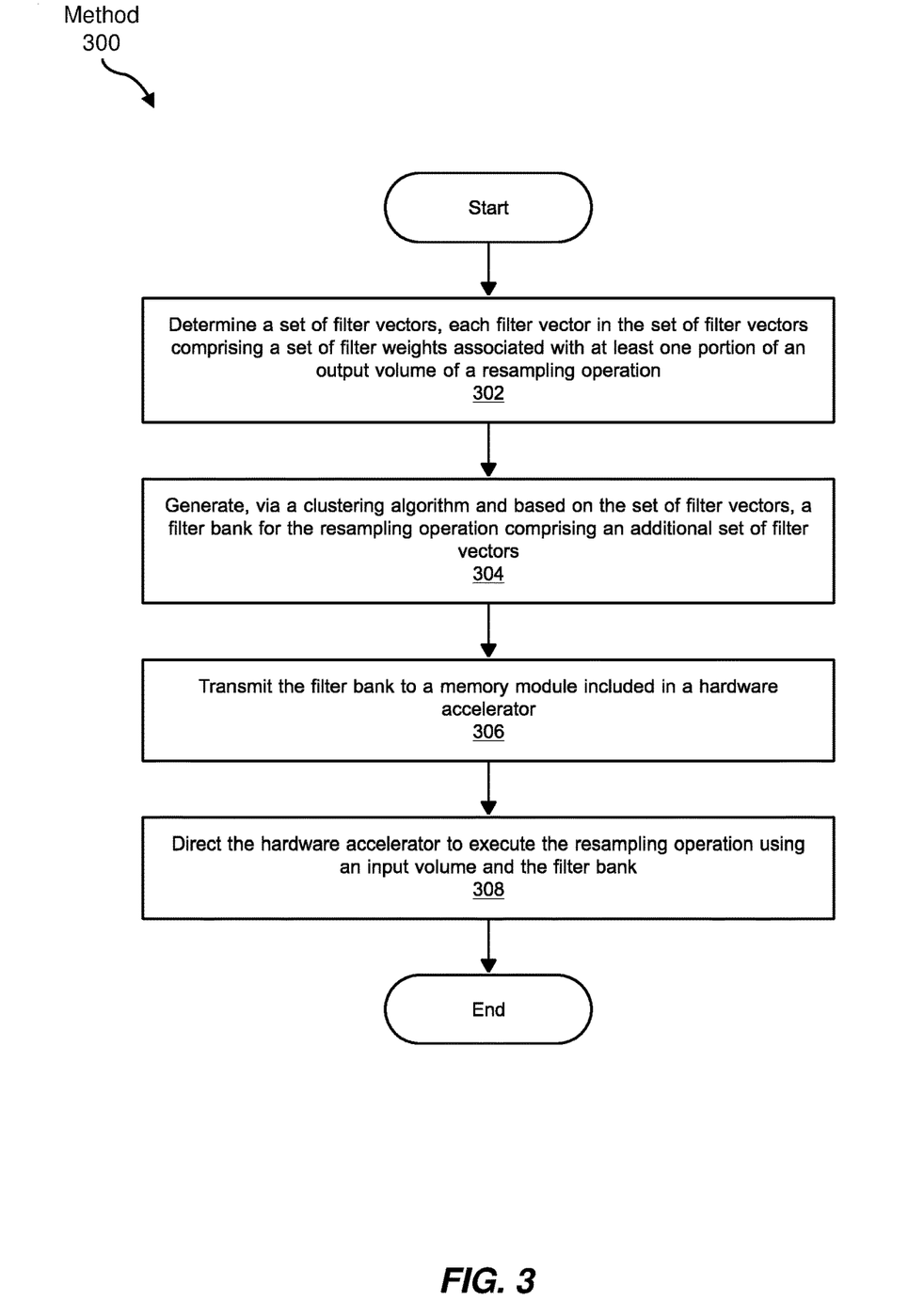
FIG. 3 is a flow diagram of an example method for hardware acceleration of resampling operations.

FIG. 3 is a flow diagram of an example computer-implemented method 300 for hardware acceleration of resampling operations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may determine a set of filter vectors, each filter vector in the set of filter vectors including a set of filter weights associated with at least one portion of an output volume of a resampling operation. For example, determining module 104 may, as part of computing device 202 in FIG. 2, cause computing device 202 to determine set of filter vectors 204, each filter vector in set of filter vectors 204 including a set of filter weights 206 associated with at least one portion of output volume 208 of resampling operation 210.

Determining module 104 may determine set of filter vectors 204 for resampling operation 210 in a variety of contexts. For example, in at least one embodiment, determining module 104 may determine set of filter vectors 204 by receiving an output parameter for the resampling operation, such as a target dimension of an output volume (e.g., 1920 pixels, 960 pixels, 480 pixels, etc.), or a sampling factor that may be used for the resampling operation. For example, a resampling factor of 0.5 may result in a 2:1 downsampling or decimation of an input image to produce an output image that may have half the resolution of the input image.

Determining module 104 may then determine a set of output locations included in the output volume based on the output parameter. Determining module 104 may also determine, based on the resampling operation, for each output location included in the set of output locations, a set of filter weights associated with a set of input locations included in the input volume. Determining module 104 may also include the set of filter weights in a filter vector and may further include the filter vector in a set of filter vectors.

As mentioned above, in some examples, a resampling operation may be used for interpolation (e.g., multivariate interpolation) of an input volume, such as to resize and/or rotate a digital image. In some of these examples, the resampling operation may be referred to as an image sampling operation. In some examples, a resampling operation may include a convolution between a kernel and an input volume (e.g., an input image). An effect of each of a set of input values included in the input volume (e.g., a set of pixels in an input image) on a particular output value included in an output volume (e.g., a pixel in an output image) may be determined and/or defined by a particular reconstruction kernel.

By way of example, a Lanczos resampling operation may include an application of a Lanczos reconstruction kernel L(x) to a set of input values. The Lanczos reconstruction kernel may be a normalized sinc function sinc(x), windowed (e.g., multiplied) by a Lanczos window or sinc window, which may be a central lobe of a horizontally stretched sinc function sinc $$\left(\frac{x}{\alpha}\right)$$

for $-\alpha \leq x \leq \alpha$. This may be expressed as:

$$L(x) = \begin{cases} \operatorname{sinc}(x) \operatorname{sinc}\left(\frac{x}{\alpha}\right) & \text{if } -\alpha < x < \alpha, \\ 0 & \text{otherwise.} \end{cases}$$

or, equivalently, $$L(x) = \begin{cases} 1 & \text{if } x = 0, \\ \dfrac{\alpha \sin \pi x \sin \pi x}{\pi^2 x^2} & \text{if } -\alpha \leq x < \alpha \text{ and } x \neq 0, \\ 0 & \text{otherwise.} \end{cases}$$

The parameter $\alpha$ is a positive integer which determines the size of the kernel. The Lanczos kernel has $2\alpha-1$ lobes: a positive one at the center, and $\alpha-1$ alternating negative and positive lobes on each side.

Given a one-dimensional signal with samples $s_i$, for integer values of i, the value S(x) interpolated at an arbitrary real argument x may be obtained by the discrete convolution of those samples with the Lanczos kernel:

$$S(x) = \sum_{i=\lfloor x \rfloor - \alpha + 1}^{\lfloor x \rfloor + \alpha} s_i L(x-i),$$

where $\alpha$ is the filter size parameter and $\lfloor x \rfloor$ is the floor function. The bounds of this sum are such that the kernel is zero outside of them. Hence, in some examples, an embodiment of one or more of the systems described herein (e.g., one or more of modules 102) may determine an output value S(x) by, for each input value (e.g., input pixel) included in the window of a Lanczos kernel (e.g., from $-\alpha$ to $\alpha$), multiplying the input value by the value of L(x) at the location of the input value relative to the expected location of the output value, and summing the result with all others within the kernel window. The value of the kernel (e.g., L(x)) corresponding to the location of the input value may be referred to as a "filter weight" or "filter weight value" corresponding to the input value.

Figure 4:
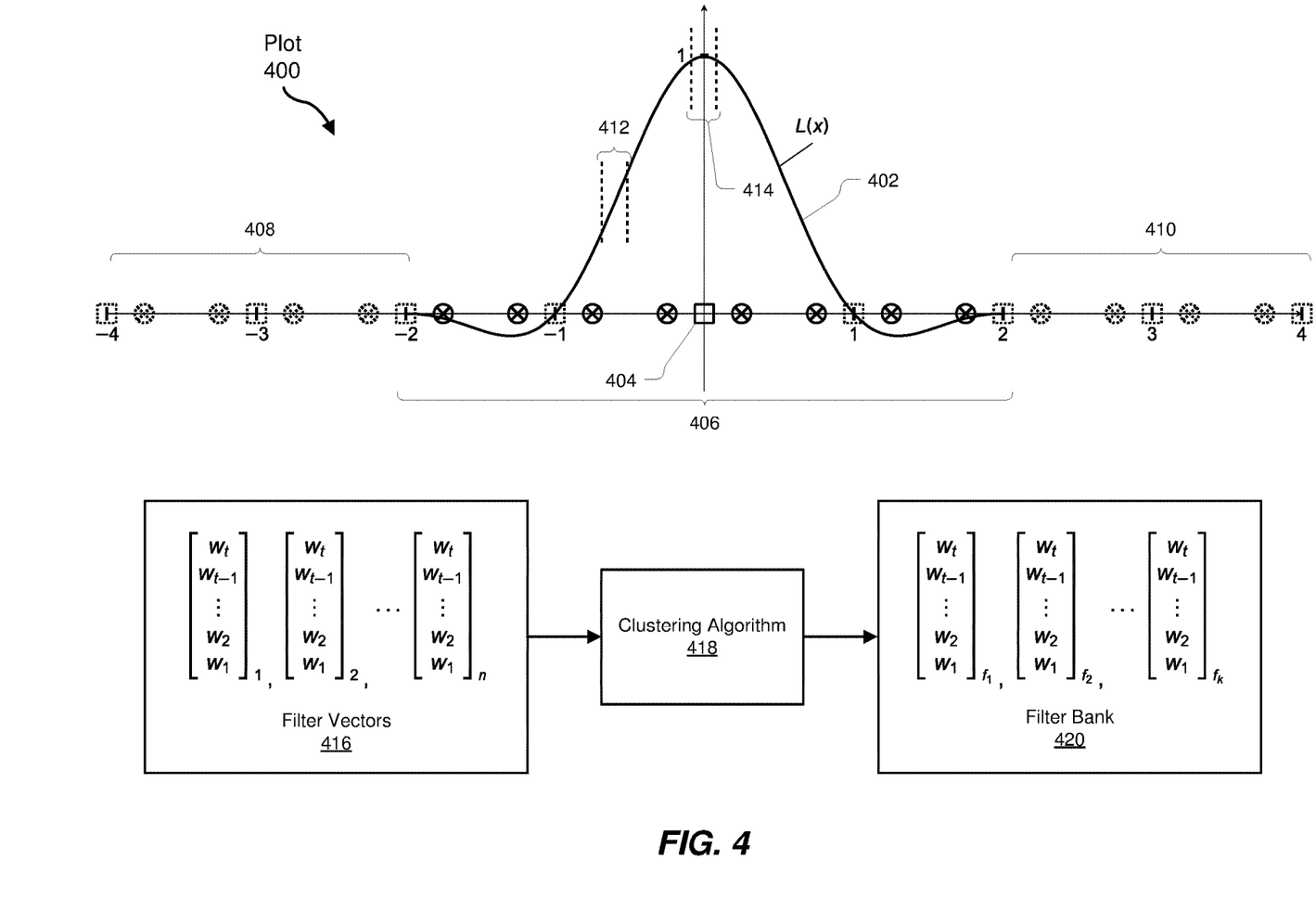
FIG. 4 illustrates determining a set of filter vectors and generating a filter bank for a resampling operation in accordance with embodiments of this disclosure.

To illustrate, FIG. 4 includes a plot 400 that may represent a convolution of a Lanczos filter of $\alpha=2$ with a set of input values to determine an output value. In this illustration, the resampling operation (e.g., resampling operation 210) is a downsampling of an input image having a horizontal resolution of 1920 pixels to an output image having a horizontal resolution of 960 pixels (e.g., a 2:1 downsampling with no horizontal offset). Although not shown in FIG. 4, Both the input image and the output image may have a common horizontal dimension of W (e.g., 5 cm, 10 in, 400 pt, etc.).

As shown, Lanczos kernel 402, also denoted as L(x) in FIG. 4, is centered along an x-axis at a location corresponding to a horizontal location (e.g., a pixel location) of output pixel 404 within an output value of an output image. Within kernel window 406 of Lanczos kernel 402, there are eight corresponding input pixels within the input image, each denoted in FIG. 4 by a circled multiplication symbol (⊗). Although other input pixels may be included in the input image, as denoted by dotted circled multiplication symbols within lower region 408 and/or upper region 410 shown in FIG. 4, these values are outside of kernel window 406, and hence have no weight as to output pixel 404 (e.g., the value of L(x) is zero outside of kernel window 406).

Furthermore, it may be seen that different segments of Lanczos kernel 402 have different rates of change of L(x). For example, segment 412 has a relatively steep positive slope, whereas segment 414 has a relatively shallow slope. This may indicate that the value of L(x) changes more significantly per x input value within segment 412 than within segment 414. Hence, including more values for x within segment 412 than segment 414 may increase an accuracy or reduce an error when using a quantized version of L(x) to resample an input volume, as will be described in greater detail below.

To determine the value of an output pixel, such as output pixel 404, one or more of the systems described herein may determine a set of filter weight values, each corresponding to a value of L(x) at the horizontal location within the input image of an input pixel included in kernel window 406 relative to the horizontal location within the output image of output pixel 404. In some examples, these filter weight values may be denoted as $w_t$, where t may represent the total number of input values within the corresponding filter or kernel window. Hence, the filter weights corresponding to the input pixels 1 to t included in kernel window 406 may be denoted by a set $\{w_1, w_2, \ldots, w_t\}$.

Determining module 104 may, for each output value in an output volume (e.g., for each output pixel in an output image), include the set of filter weights corresponding to that output value in a corresponding filter vector, and may further include the corresponding filter vector within a set of filter vectors that may represent all filter weights associated with a set of output values. As mentioned above, a filter vector may include any data structure that may represent a set of filter coefficients that may be associated with application of a resampling operation to an input volume and/or an output volume. By way of illustration, FIG. 4 includes a set of filter vectors 416 that may represent a set of n filter vectors corresponding to n output values, each filter vector in set of filter vectors 416 having t filter weights.

Returning to FIG. 3, at step 320, one or more of the systems described herein may generate, via a clustering algorithm and based on a set of filter vectors, a filter bank for a resampling operation. The filter bank may include an additional set of filter vectors. For example, generating module 106 may, as part of computing device 202 in FIG. 2, generate, via clustering algorithm 212 and based on set of filter vectors 204, filter bank 214 for resampling operation 210, such that filter bank 214 may include additional set of filter vectors 216.

As mentioned above, a clustering algorithm may include any method or process that groups a set of objects in such a way that objects in the same group (e.g., cluster) are more similar in some sense to each other than to those in other groups (e.g., clusters). By way of illustration, and without limitation, a k-means clustering method may be an example of a clustering algorithm that may partition n samples into k clusters in which each sample belongs to the group having the nearest mean value or centroid. The mean value or centroid may then serve as a prototype for the samples in the group.

When applied in a vector space, a clustering algorithm may quantize a set of vectors in the vector space into a finite set of values from a discrete subspace of lower dimension. For example, given a set of n vectors or points scattered randomly throughout a vector space, a clustering algorithm such as a k-means clustering algorithm may determine a set of k centroid points or vectors that may each have approximately the same number of the vectors or points closest to them within the vector space. Hence, each centroid point or vector may represent all points within a corresponding cluster or subdivision of the vector space with a relatively small amount of error.

Embodiments of the systems and methods described herein (e.g., one or more of modules 102) may use a clustering algorithm (e.g., clustering algorithm 212) to generate an additional set of filter vectors (e.g., additional set of filter vectors 216), also referred to as a filter bank (e.g., filter bank 214), that that may represent a larger set of filter vectors (e.g., set of filter vectors 204). In at least this way, the systems and methods described herein may be said to quantize set of filter vectors 204 for resampling operation 210 to filter bank 214 and may therefore apply principles of vector quantization to resampling of input data.

Generating module 106 may generate, via clustering algorithm 212 and based on set of filter vectors 204, filter bank 214 for resampling operation 210 in a variety of contexts. For example, generating module 106 may determine, in accordance with clustering algorithm 212, a representative set of filter vectors for the resampling operation based on set of filter vectors 204.

Generating module 106 use any suitable algorithm, process, or method to generate filter bank 214. For example, as described above, a k-means clustering algorithm may partition n observations or samples (e.g., filter vectors included in set of filter vectors 204) into k sets S={$S_1, \ldots S_k$}, where k≤n, so as to minimize the within-cluster sum of squares (WCSS).

One possible iterative refinement technique for determining a representative set of filter vectors may be a k-means algorithm, also referred to as Lloyd's algorithm. Given an initial set of k means {$m_1^{(1)}, m_2^{(1)}, \ldots, m_k^{(1)}$} (determined via any suitable initialization method such as Random Partition or Forgy), the algorithm may include two alternating steps: an assignment step and an update step. During the assignment step, generating module 106 may assign each observation or sample to a cluster whose mean has the least squared Euclidean distance:

$$S_i^t = \{x_p : \|x_p - m_i^t\|^2 \leq \|x_p - m_j^t\|^2 \forall j, 1 \leq j \leq k\},$$

where each $x_p$ is assigned to exactly one $S^{(t)}$, even if it could be assigned to two or more.

During the update step, generating module 106 may calculate the new means (centroids) of the observations in the new clusters:

$$m_i^{(t+1)} = \frac{1}{|S_i^{(t)}|} \sum_{x_j \in S_i^{(t)}} x_j.$$

Generating module 106 may determine that the algorithm has converged when the assignments no longer change.

In some examples, the resulting centroids may include observations or samples (e.g., filter vectors) included in the initial set of n samples or observations (e.g., set of filter vectors 204) and/or samples or observations (e.g. filter vectors) determined or calculated via any suitable method, such as the foregoing.

After applying the clustering algorithm to set of filter vectors 204, generating module 106 may then include the resulting representative set of filter vectors (e.g., centroids) in filter bank 214. Hence, returning to FIG. 4, generating module 106 may apply clustering algorithm 418 to set of filter vectors 416 to generate filter bank 420. Filter bank 420 includes k filter vectors that may each include t filter weights. Each filter vector included in filter bank 420 may be representative (e.g., a centroid) of a set or cluster of one or more filter vectors included in set of filter vectors 416.

In some examples, generating module 106 may additionally generate an index (e.g., index 220) that associates each filter vector included in a filter bank (e.g., filter bank 214) with at least one segment of an output volume (e.g., output volume 208). The index may indicate a set of output volume locations that may correspond to (e.g., be associated with filter vectors included in the same cluster as) each filter vector included in the filter bank (e.g., filter bank 214). As will be described in greater detail below, one or more of modules 102 may use the index to direct a hardware accelerator (e.g., hardware accelerator 140) which of the filter vectors included in the filter bank to use to determine an output value for a segment of (e.g., a pixel included in) an output volume.

Figure 5:
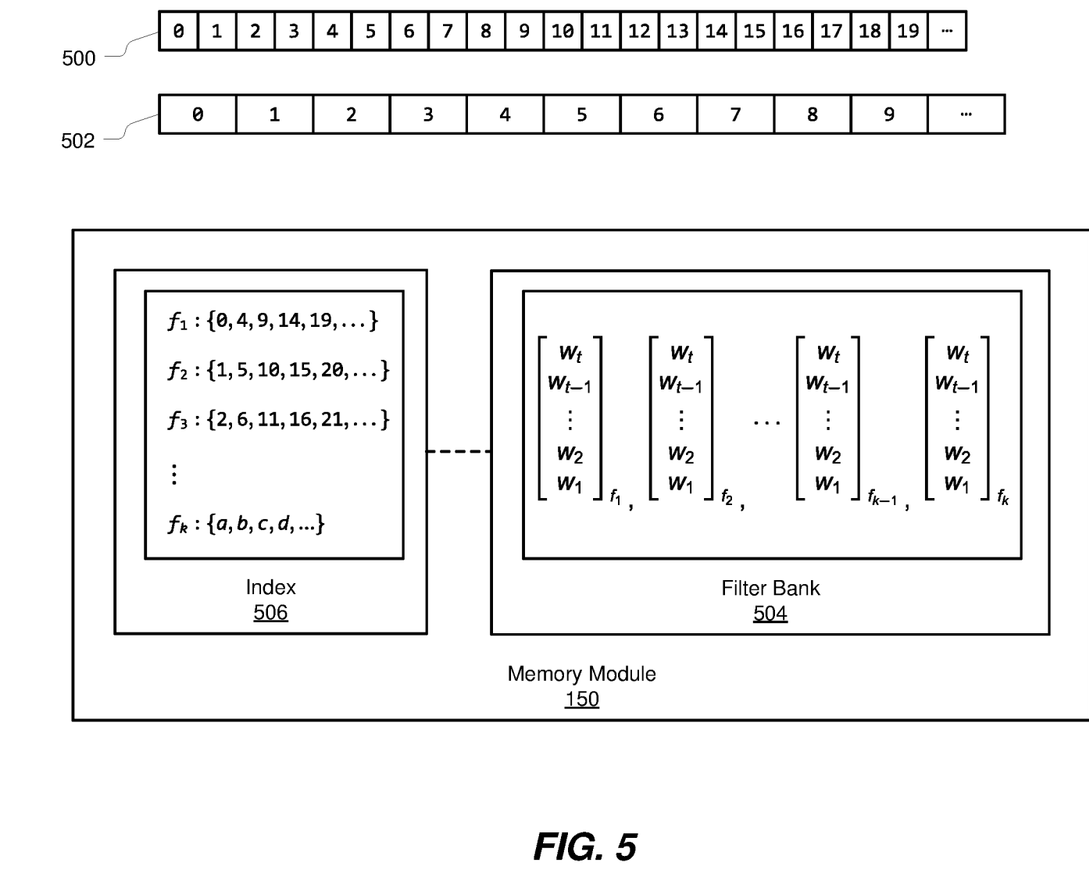
FIG. 5 illustrates an index of a filter bank that associates each filter vector included in a filter bank with at least one segment of an output volume in accordance with embodiments of this disclosure.

By way of illustration, FIG. 5 shows an input image portion 500 and an output image portion 502. As shown, output image portion 502 may represent an arrangement or relative locations of anticipated output pixels included in a portion of an output image. Individual pixels within output image portion 502 may represent anticipated or expected locations of pixels that may result from a 2:1 downsampling of input volume portion 500 via a resampling operation (e.g., resampling operation 210). For example, input volume portion 500 may include 20 input pixel locations, numbered 0 to 19 in FIG. 5, while output image portion 502 may include 10 output pixel locations, numbered 0 to 9 in FIG. 5, that may span substantially the same linear dimension as the input pixels included in input image portion 500.

FIG. 5 also includes a filter bank 504 for a resampling operation (e.g., a 2:1 downsampling operation) that includes k filter vectors {$f_1, f_2, \ldots, f_{k-1}, f_k$}. One or more of the systems described herein (e.g., generating module 106) may have generated filter bank 504 in any of the ways described herein, such as via a clustering algorithm. One or more of modules 102 (e.g., generating module 106) may also have generated index 506 that associates each filter vector included in filter bank 504 with at least one segment (e.g., at least one output pixel and/or output pixel location) included in an output volume (e.g., an output image that includes output image portion 502). As shown in FIG. 5, index 506 associates filter vector $f_1$ with a set of output locations {0, 4, 9, 14, 19, . . . }, filter vector $f_2$ with an additional set of output locations {1, 5, 10, 15, 20, . . . }, and so forth. This may indicate that one or more systems described herein (e.g., directing module 110) may direct a hardware accelerator (e.g., hardware accelerator 140) to use filter weights included in filter vector $f_1$ when executing the resampling operation on pixels located in positions 0, 4, 9, 14, 19, etc. of an output volume, filter weights included in filter vector $f_2$ when executing the resampling operation on pixels located in positions 1, 5, 10, 15, 20, etc. of the output volume, and so forth.

Generating module 106 may generate the index of the filter bank in any suitable way. For example, as shown in FIG. 5, generating module 106 may generate the index such that the index expressly associates particular segments of an output volume (e.g., locations of pixels in an output image) with particular filter vectors included in the filter bank. In additional or alternative embodiments, an index may include a function or other relational expression that may describe a relationship between filter vectors included in the filter bank and segments of the output volume. For example, an index may include a relational expression that associates every m-th segment of the output volume (e.g., every m-th pixel) with filter vector $f_1$, every m+1-th segment of the output volume with filter vector $f_2$, and so forth.

Additionally or alternatively, in some examples, a sampling ratio of a resampling operation (e.g., 2:1, 3:1, 3:2, etc.) may introduce or include a periodicity that may result in a number of centroid filter vectors that may be fewer than a maximum number of filter vectors (e.g., k clusters or filter vectors) supported by a hardware accelerator (e.g., hardware accelerator 140). As will be described in greater detail below, one or more of the systems described herein (e.g., generating module 106, transmitting module 108) may transmit this smaller number of centroid filter vectors to the hardware accelerator. One or more of the systems described herein (e.g., directing module 110) may order and/or reference the smaller number of filter vectors (e.g., within one or more memory devices associated with and/or included in hardware accelerator 140) such that, when the hardware accelerator executes the resampling operation, the hardware accelerator may use the centroid filter vectors sequentially (e.g., in a predetermined pattern such as 0, 1, 2, 3, 4, 0, 1, 2, 3, 4, and so forth) to generate output values (e.g., output pixel values). In such examples, the hardware accelerator and/or one or more of the systems described herein (e.g., hardware accelerator 140, directing module 110, etc.) may infer or automatically deduce an index (e.g., index 220) from this sequence, and hence one or more of the systems described herein (e.g., transmitting module 108) may refrain from explicitly transmitting an index to the hardware accelerator.

In some examples, at least one of modules 102 (e.g., generating module 106) may generate filter bank 214 based on a memory requirement associated with resampling operation 210. For example, hardware accelerator 140 and/or memory module 150 may be capable of storing a predetermined number of weight values and/or filter vectors. Hence, generating module 106 may generate filter bank 214 such that filter bank 214 includes only up to the predetermined number of weight values and/or filter vectors. One way generating module 106 may do so may be by using a value up to the predetermined number of weight values and/or filter vectors as the number of clusters and/or partitions for a clustering algorithm, such as k in a k-means clustering algorithm. In this way, generating module 106 may generate filter bank 214 such that filter bank 214 may include up to the predetermined number (i.e., k) of weight values and/or filter vectors, and may therefore meet the memory requirement associated with the resampling operation.

For example, memory module 150 may include sufficient memory to store and/or maintain 128 filter vectors that may each include 30 filter weights. Additionally, memory module 150 may include sufficient memory to also store and/or maintain an index that associates each of the 128 filter vectors with one or more output values (e.g., output pixels). Generating module 106 may therefore execute a clustering algorithm (e.g., a k-means clustering algorithm) that may partition a set of filter vectors (e.g., set of filter vectors 204) into 128 partitions. For each partition, generating module 106 may determine a centroid filter vector associated with the partition (e.g., via the clustering algorithm) and may include the centroid filter vector associated with the partition in a representative set of filter vectors that may be included in filter bank 214. Additionally, in some examples, generating module 106 may also generate an index that that associates each of the filter vectors included in filter bank 214 with at least one segment of output volume 208 (e.g., at least one output pixel). Hence, generating module 106 may generate filter bank 214 such that filter bank 214 includes 128 filter vectors (and, in some examples, an index that associates the 128 filter vectors with one or more segments of output volume 208). Filter bank 214 (and an associated index) may therefore meet the memory requirement of resampling operation 210 and/or a memory availability of hardware accelerator 140 and/or memory module 150.

In one or more embodiments, generating module 106 may adjust a precision of a centroid filter vector prior to including the centroid filter vector in the representative set of filter vectors. For example, determining module 104 may determine a set of filter vectors in an initial precision (e.g., 64 bits, 32 bits, 16 bits, etc.). Generating module 106 may then perform k-means clustering on the filter vectors to determine a set of centroid filter vectors. Generating module 106 may then adjust (e.g., reduce and/or increase) the precision of the centroid filter vectors to a secondary precision (e.g., 8 bits, 10 bits, 12 bits, 14 bits, 16 bits, etc.) before including the reduced-precision centroid filter vectors in the filter bank. In this way, the systems and methods described herein may take advantage of all available precision while performing the clustering operation. Additionally, adjusting a precision of the centroid filter vectors may also reduce memory usage within, and/or power usage by, the hardware accelerator (e.g., hardware accelerator 140) while maintaining high resampling quality.

Returning to FIG. 3, at step 330, one or more of the systems described herein may transmit a filter bank to a memory module included in a hardware accelerator. For example, transmitting module 108 may, as part of computing device 202 in FIG. 2, transmit filter bank 214 to memory module 150 included in hardware accelerator 140.

Transmitting module 108 may cause computing device 202 to transmit filter bank 214 to memory module 150 included in hardware accelerator 140 in any suitable way. For example, as described above, in some examples, hardware accelerator 140 may be included as part of computing device 202, and hence one or more of modules 102 (e.g., generating module 106, transmitting module 108, etc.) may be communicatively coupled to hardware accelerator 140 via any suitable computing bus or computing bus interface (e.g., an internal bus, a local bus, an internal data bus, a system bus, a Front-Side Bus, etc.). In additional embodiments, although not illustrated in FIG. 2, hardware accelerator 140 may be included as part of a computing device separate and/or distinct (e.g., physically distinct, logically distinct, etc.) from computing device 202. In such embodiments, at least one of modules 102 (e.g., generating module 106, transmitting module 108, etc.) may be communicatively coupled to hardware accelerator 140 via any suitable external bus and/or data network.

Hence, transmitting module 108 may cause computing device 202 to transmit filter bank 214 to memory module 150 included in hardware accelerator 140 via any available communication method and/or medium that may communicatively couple one or more of modules 102 (e.g., generating module 106, transmitting module 108, etc.) to hardware accelerator 140 and/or memory module 150. In some examples where generating module 108 has generated an index of filter bank 214 as described above, transmitting module 108 may similarly cause computing device 202 to transmit the index of filter bank 214 to memory module 150.

Figure 6:
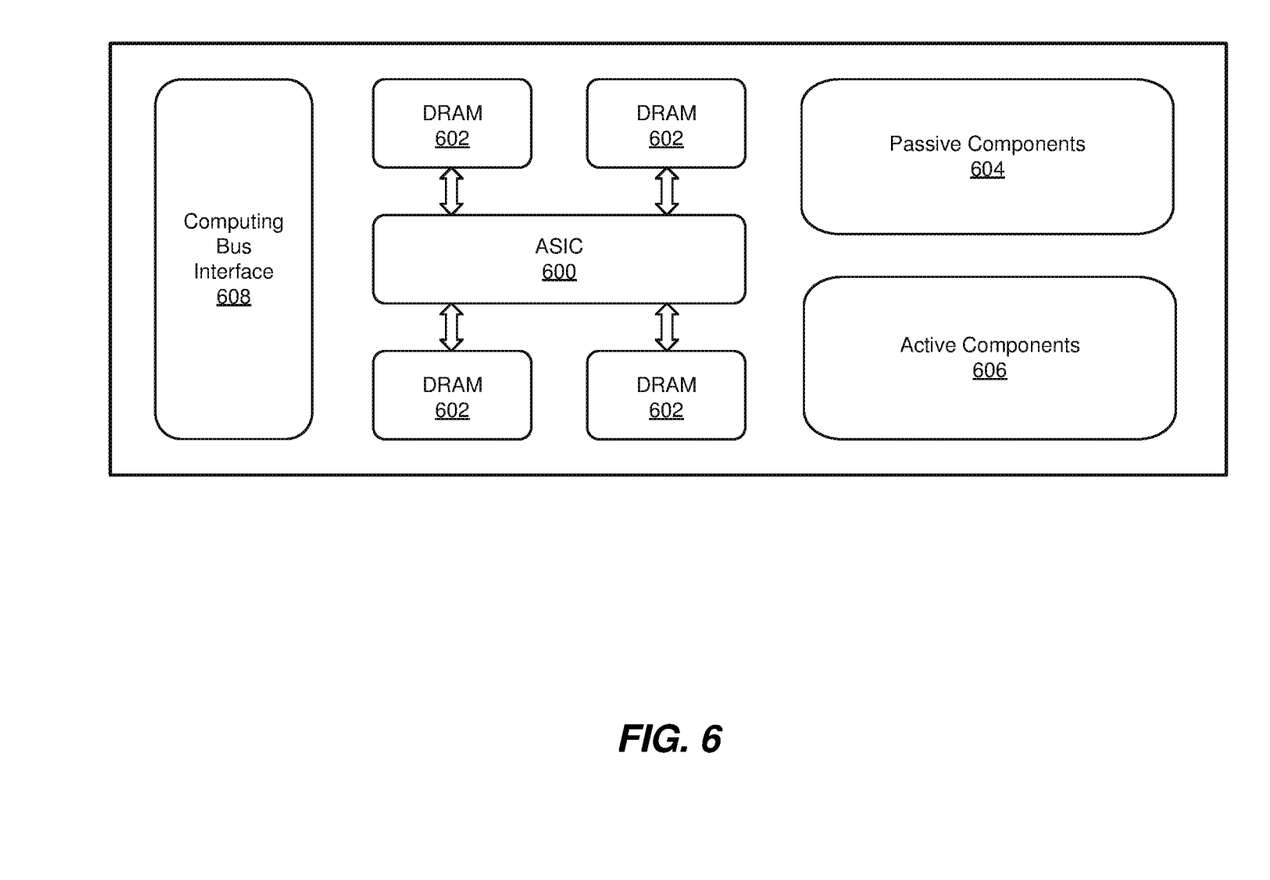
FIG. 6 is a block diagram of an example hardware accelerator capable of performing one or more resampling operations in accordance with embodiments of this disclosure.

FIG. 6 shows a more detailed block diagram of hardware accelerator 140. As shown in this figure, hardware accelerator 140 may include at least one specialized processor in the form of an ASIC 600. As further shown in this figure, hardware accelerator 140 may also include one or more instances of dynamic random-access memory (DRAM) 602, each of which may be coupled to ASIC 600. In this example, one or more instances of DRAM 602 may be included as at least part of memory module 150.

Hardware accelerator 140 may also include one or more passive components 604, including resistors, capacitors, inductors, and/or transistors. Additionally, or alternatively, hardware accelerator 140 may also include one or more active components 606. Each of the passive components and/or active components may be specifically designed and/or placed on hardware accelerator 140 in a configuration that executes or performs (and/or enables ASIC 600 to perform), in hardware, the specific application in question, such as the resampling operation 210. Lastly, hardware accelerator 140 may also include a computing bus interface 608, such as a PCI EXPRESS interface, which may translate data formatted by ASIC 600 for transmission across a computing bus to which hardware accelerator 140 may be coupled.

Returning to FIG. 3, at step 340, one or more of the systems described herein may direct a hardware accelerator to execute a resampling operation using an input volume and a filter bank. For example, directing module 110 may, as part of computing device 202 in FIG. 2, direct hardware accelerator 140 to execute resampling operation 210 using input volume 222 and filter bank 214.

Directing module 110 may direct hardware accelerator 140 to execute resampling operation 210 using input volume 222 and filter bank 214 in a variety of contexts. For example, directing module 110 may direct hardware accelerator 140 to use a corresponding filter vector included in filter bank 214 to determine values or proportions of input values (e.g., input pixels) included in input volume 222 to include in an output value (e.g., an output pixel) included in output volume 208.

As described above, in some examples, filter bank 214 may include and/or be associated with an index 220 that may associate each filter vector included in filter bank 214 with at least one segment (e.g., one pixel) of output volume 208. When executing resampling operation 210 to generate a segment (e.g., pixel) of output volume 208, directing module 110 may determine, using index 220, a filter vector associated with the output value. Directing module 110 may then direct hardware accelerator 140 to use the filter vector associated with the output value to determine an output value of the segment (e.g., pixel) of output volume 208 in accordance with resampling operation 210.

For example, returning to FIG. 5, when hardware accelerator 140 executes a resampling operation using input image portion 500 to determine a value of output pixel location 2 included in output image portion 502, directing module 110 may access index 506 and may determine, using index 506, that output pixel location 2 is associated with filter vector $f_2$ included in filter bank 504. Hence, directing module 110 may direct hardware accelerator 140 to use filter weights $\{w_1, w_1, \ldots w_t\}$ included in filter vector $f_2$ when hardware accelerator 140 executes resampling operation 210 as to output pixel location 2. Because the filter weights have already been determined (e.g., by determining module 104 and/or generating module 106 using physical processor 130), hardware accelerator 140 may be relieved of a computing burden associated with calculating or re-calculating filter weights for the corresponding input pixels when determining an output value for output pixel location 2. This operation may be repeated as many times as necessary to execute resampling operation 210 as to all output values included in an output volume (e.g., an output image that includes output image portion 502).

Figure 7:
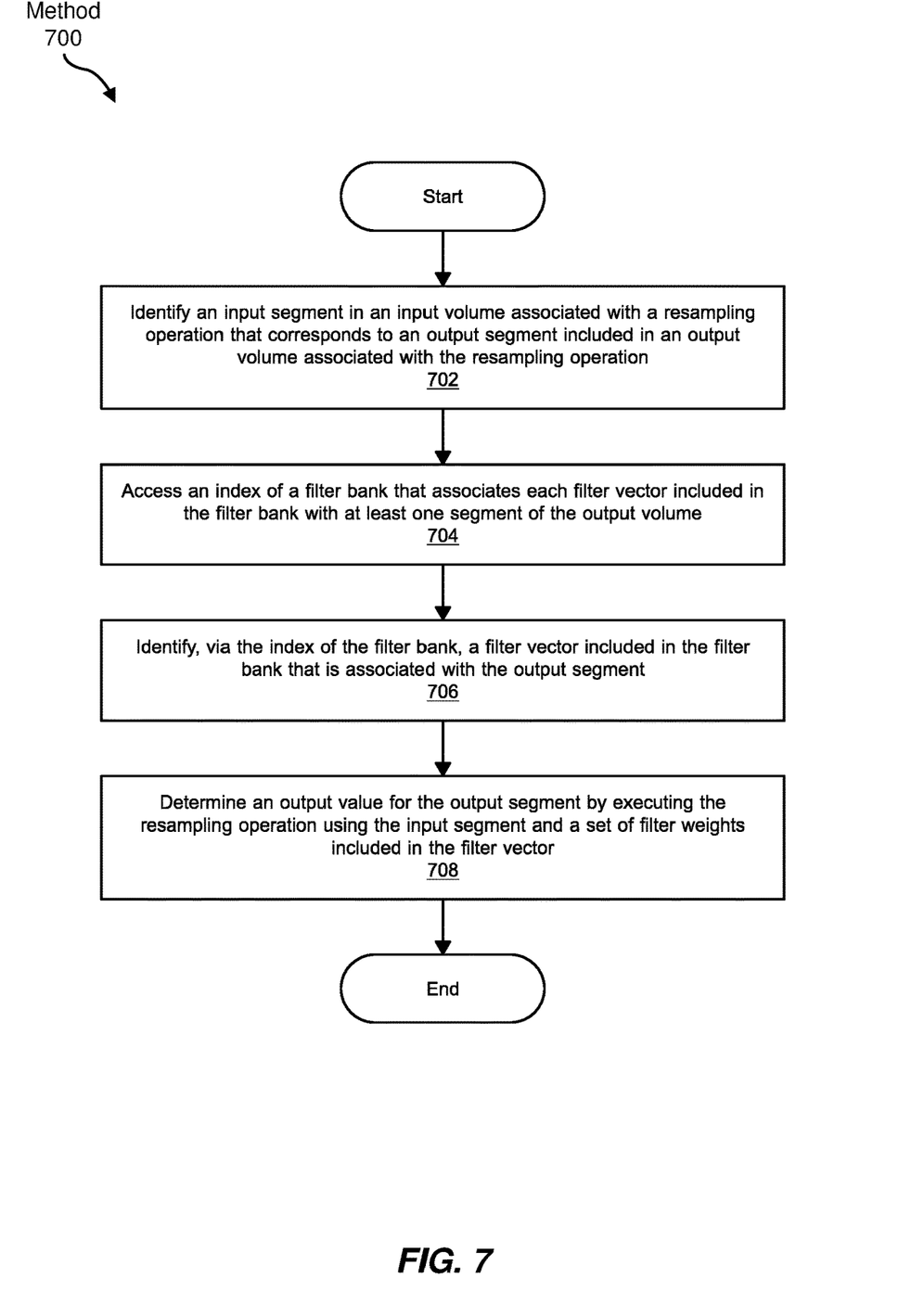
FIG. 7 is a flow diagram of an example method for executing a resampling operation using a filter bank and an input volume via a hardware accelerator in accordance with embodiments of this disclosure.

FIG. 7 is a flow diagram of an example method 700 for executing a resampling operation using a filter bank and an input volume. The steps shown in FIG. 7 may be performed by any suitable computer-executable code and/or computing system, including one or more of modules 102 and/or hardware accelerator 140 shown in FIGS. 1 and 2. In some examples, each of the steps shown in FIG. 7 may represent an algorithm whose structure includes and/or is represented by multiple sub-steps.

At step 702, one or more of the systems described herein may identify an input segment (e.g., a set of input pixels) in an input volume (e.g., an input image) associated with a resampling operation (e.g., a Lanczos resampling operation) that corresponds to an output segment (e.g., one or more output pixels) included in an output volume (e.g., a re-sampled version of the input volume) associated with the resampling operation. At step 704, one or more of the systems described herein may access an index of a filter bank that associates each filter vector included in the filter bank with at least one segment of the output volume. At step 706, one or more of the systems described herein may identify, via a filter bank, a filter vector included in the filter bank that is associated with the output segment. At step 708, one or more of the systems described herein may determine an output value for the output segment by executing the resampling operation using the input segment and a set of filter weights included in the filter vector.

As discussed throughout the instant disclosure, the disclosed systems and methods may provide one or more advantages over traditional operations for hardware acceleration of resampling operations. For example, by generating a filter bank that includes a representative set of filter vectors for a resampling operation, embodiments of the systems and methods described herein may efficiently reduce a large number of possible filter weights for the resampling operation to a filter bank, which may include a smaller, representative set of filter weights.

The filter bank may meet a relatively restrictive memory limitation or requirement of a hardware accelerator and may therefore enable the hardware accelerator to efficiently execute the resampling operation within the memory limitation or requirement of the hardware accelerator. Furthermore, as embodiments of the systems and methods described herein may generate the filter bank via a clustering algorithm (e.g., clustering techniques applied to vectorized filter weights), the hardware accelerator may generate the filter bank and/or execute the resampling operation using the filter bank without significantly reducing resampling quality and/or accuracy in comparison to more memory-intensive resampling techniques. Hence, the disclosed systems and methods described herein may improve efficiency and/or accuracy of high-quality, hardware-accelerated image and/or video resampling operations.

Additional optimizations may be enabled by systems and methods described herein. For example, a resampling operation may generally involve or require multiple sets of filters, such as a horizontal set of filters for horizontal resampling and a vertical set of filters for vertical resampling. However, in many practical applications, the resampling ratio for both horizontal and vertical dimensions may be the same, meaning that the resulting filters may also be the same. In such examples, the systems and methods described herein may reuse filters calculated for a first dimension for resampling an input volume (e.g., an image) in a second dimension. In other words, an example system (e.g., one or more of modules 102) may determine a horizontal set of filters and may use the horizontal set of filters to resample an image in a horizontal dimension. The example system may then reuse the horizontal set of filters to resample the image in a vertical dimension. Likewise, an example system (e.g., one or more of modules 102) may determine a vertical set of filters and may use the vertical set of filters to resample an image in a vertical dimension. The example system may then reuse the horizontal set of filters to resample the image in a horizontal dimension.

EXAMPLE EMBODIMENTS

Example 1: A computer-implemented method comprising (1) determining a set of filter vectors, each filter vector in the set of filter vectors comprising a set of filter weights associated with at least one portion of an output volume of a resampling operation, (2) generating, via a clustering algorithm and based on the set of filter vectors, a filter bank for the resampling operation comprising an additional set of filter vectors, (3) transmitting the filter bank to a memory module included in a hardware accelerator, and (4) directing the hardware accelerator to execute the resampling operation using an input volume and the filter bank.

Example 2: The computer-implemented method of example 1, wherein (1) the method further comprises (a) generating an index of the filter bank that associates each filter vector included in the filter bank with at least one segment of the output volume, and (b) transmitting the index of the filter bank to the memory module included in the hardware accelerator, and (2) directing the hardware accelerator to execute the resampling operation using the filter bank further comprises directing the hardware accelerator to execute the resampling operation using the filter bank and the index.

Example 3: The computer-implemented method of any of examples 1 and 2, wherein generating, via the clustering algorithm, the filter bank for the resampling operation comprises (1) determining, in accordance with the clustering algorithm, a representative set of filter vectors for the resampling operation based on the set of filter vectors, and (2) including the representative set of filter vectors in the filter bank.

Example 4: The computer-implemented method of example 3, wherein determining, in accordance with the clustering algorithm, the representative set of filter vectors included in the set of filter vectors comprises (1) partitioning, in accordance with the clustering algorithm, the set of filter vectors into a predetermined number of partitions, and (2) for each partition (a) determining a centroid filter vector associated with the partition, and (b) including the centroid filter vector associated with the partition in the representative set of filter vectors.

Example 5: The computer-implemented method of example 4, wherein (1) each filter weight included in each filter vector included in the set of filter vectors is represented in accordance with an initial precision, and (2) determining the centroid filter vector associated with the partition comprises (a) determining the centroid filter vector associated with the partition while each filter weight included in each filter vector included in the set of filter vectors is represented in accordance with the initial precision, and (b) adjusting a precision of the centroid filter vector to a secondary precision prior to including the centroid filter vector associated with the partition in the representative set of filter vectors.

Example 6: The computer-implemented method of any of examples 4 and 5, wherein determining the centroid filter vector associated with the partition comprises at least one of (1) designating a filter vector included in the partition as the centroid filter vector, or (2) determining the centroid filter vector based on at least one filter vector included in the partition.

Example 7: The computer-implemented method of any of examples 1-6, wherein the clustering algorithm comprises at least one of (1) a k-means clustering algorithm, (2) a mean-shift clustering algorithm, (3) a hierarchical clustering algorithm, or (4) an expectation-maximization algorithm.

Example 8: The computer-implemented method of any of examples 1-7, wherein the resampling operation comprises at least one of (1) a bicubic resampling operation, (2) a Sinc resampling operation, or (3) a Lanczos resampling operation.

Example 9: The computer-implemented method of any of examples 1-8, wherein determining the set of filter vectors for the resampling operation comprises (1) receiving an output parameter for the resampling operation, (2) determining (a) a set of output locations included in the output volume based on the output parameter, and (b) based on the resampling operation, for each output location included in the set of output locations, a set of filter weights associated with a set of input locations included in the input volume, and (3) including (a) the set of filter weights in a filter vector, and (b) the filter vector in the set of filter vectors.

Example 10: The computer-implemented method of example 9, wherein (1) the input volume comprises at least part of an input image, (2) the output parameter comprises at least one of (a) a sampling factor, or (b) a target dimension of the output volume, (3) the resampling operation comprises an image sampling operation, and (4) the output volume comprises a version of the input image sampled in at least one dimension in accordance with the output parameter and the image sampling operation.

Example 11: The computer-implemented method of any of examples 1-10, wherein generating the filter bank for the resampling operation is further based on a memory requirement associated with the resampling operation.

Example 12: The computer-implemented method of any of examples 1-11, further comprising normalizing the set of filter weights included in each filter vector to a predetermined value.

Example 13: A system comprising (1) a determining module, stored in memory, that determines a set of filter vectors, each filter vector in the set of filter vectors comprising a set of filter weights associated with at least one portion of an output volume of a resampling operation, (2) a generating module, stored in memory, that generates, via a clustering algorithm and based on the set of filter vectors, a filter bank for the resampling operation comprising an additional set of filter vectors, (3) a transmitting module, stored in memory, that transmits the filter bank to a memory module included in a hardware accelerator, (4) a directing module, stored in memory, that directs the hardware accelerator to execute the resampling operation using an input volume and the filter bank, and (5) at least one physical processor that executes the determining module, the generating module, the transmitting module, and the directing module.

Example 14: The system of example 13, wherein (1) the generating module further generates an index of the filter bank that associates each filter vector included in the filter bank with at least one segment of the output volume, and (2) the transmitting module further transmits the index of the filter bank to the memory module included in the hardware accelerator, and (3) the directing module directs the hardware accelerator to execute the resampling operation using the filter bank further by directing the hardware accelerator to execute the resampling operation using the filter bank and the index.

Example 15: The system of any of examples 13 and 14, wherein the generating module generates, via the clustering algorithm, the filter bank for the resampling operation by (1) determining, in accordance with the clustering algorithm, a representative set of filter vectors for the resampling operation based on the set of filter vectors, and (2) including the representative set of filter vectors in the filter bank.

Example 16: The system of example 15, wherein the generating module identifies, in accordance with the clustering algorithm, the representative set of filter vectors included in the set of filter vectors by (1) partitioning, in accordance with the clustering algorithm, the set of filter vectors into a predetermined number of partitions, and (2) for each partition (a) determining a centroid filter vector associated with the partition, and (b) including the centroid filter vector associated with the partition in the representative set of filter vectors.

Example 17: The system of example 16, wherein (1) each filter weight included in each filter vector included in the set of filter vectors is represented in accordance with an initial precision, and (2) determining the centroid filter vector associated with the partition comprises: (a) determining the centroid filter vector associated with the partition while each filter weight included in each filter vector included in the set of filter vectors is represented in accordance with the initial precision, and (b) adjusting a precision of the centroid filter vector to a secondary precision prior to including the centroid filter vector associated with the partition in the representative set of filter vectors.

Example 18: The system of any of examples 13-17, wherein the determining module determines the set of filter vectors for the resampling operation by (1) receiving an output parameter for the resampling operation, (2) determining (a) a set of output locations included in the output volume based on the output parameter, and (b) based on the resampling operation, for each output location included in the set of output locations, a set of filter weights associated with a set of input locations included in the input volume, and (3) including (a) the set of filter weights in a filter vector, and (b) the filter vector in the set of filter vectors.

Example 19: The system of any of examples 13-18, wherein the determining module further normalizes the set of filter weights included in each filter vector to a predetermined value.

Example 20: A non-transitory computer-readable medium comprising computer-readable instructions that, when executed by at least one processor of a computing system, cause the computing system to (1) determine a set of filter vectors, each filter vector in the set of filter vectors comprising a set of filter weights associated with at least one portion of an output volume of a resampling operation, (2) generate, via a clustering algorithm and based on the set of filter vectors, a filter bank for the resampling operation comprising an additional set of filter vectors, (3) transmit the filter bank to a memory module included in a hardware accelerator, and (4) direct the hardware accelerator to execute the resampling operation using an input volume and the filter bank.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive filter data and/or image data to be transformed, transform the filter data and/or image data, output a result of the transformation to resample image data, use the result of the transformation to resample image data, and store the result of the transformation to resample additional image data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    determining a set of filter vectors, each filter vector in the set of filter vectors comprising a set of filter weights associated with at least one portion of an output volume of a resampling operation;
    generating, via a clustering algorithm and based on the set of filter vectors, a filter bank for the resampling operation comprising an additional set of filter vectors;
    transmitting the filter bank to a memory module included in a hardware accelerator; and
    directing the hardware accelerator to execute the resampling operation using an input volume and the filter bank.

2. The computer-implemented method of claim 1, wherein:
    the method further comprises:
        generating an index of the filter bank that associates each filter vector included in the filter bank with at least one segment of the output volume; and
        transmitting the index of the filter bank to the memory module included in the hardware accelerator; and
    directing the hardware accelerator to execute the resampling operation using the filter bank further comprises directing the hardware accelerator to execute the resampling operation using the filter bank and the index.

3. The computer-implemented method of claim 1, wherein generating, via the clustering algorithm, the filter bank for the resampling operation comprises:
    determining, in accordance with the clustering algorithm, a representative set of filter vectors for the resampling operation based on the set of filter vectors; and
    including the representative set of filter vectors in the filter bank.

4. The computer-implemented method of claim 3, wherein determining, in accordance with the clustering algorithm, the representative set of filter vectors included in the set of filter vectors comprises:
    partitioning, in accordance with the clustering algorithm, the set of filter vectors into a predetermined number of partitions; and
    for each partition:
        determining a centroid filter vector associated with the partition; and
        including the centroid filter vector associated with the partition in the representative set of filter vectors.

5. The computer-implemented method of claim 4, wherein:
    each filter weight included in each filter vector included in the set of filter vectors is represented in accordance with an initial precision; and
    determining the centroid filter vector associated with the partition comprises:
        determining the centroid filter vector associated with the partition while each filter weight included in each filter vector included in the set of filter vectors is represented in accordance with the initial precision; and
        adjusting a precision of the centroid filter vector to a secondary precision prior to including the centroid filter vector associated with the partition in the representative set of filter vectors.

6. The computer-implemented method of claim 4, wherein determining the centroid filter vector associated with the partition comprises at least one of:
    designating a filter vector included in the partition as the centroid filter vector; or
    determining the centroid filter vector based on at least one filter vector included in the partition.

7. The computer-implemented method of claim 1, wherein the clustering algorithm comprises at least one of:
    a k-means clustering algorithm;
    a mean-shift clustering algorithm;
    a hierarchical clustering algorithm; or
    an expectation-maximization algorithm.

8. The computer-implemented method of claim 1, wherein the resampling operation comprises at least one of:
   a bicubic resampling operation;
   a Sinc resampling operation; or
   a Lanczos resampling operation.

9. The computer-implemented method of claim 1, wherein determining the set of filter vectors for the resampling operation comprises:
   receiving an output parameter for the resampling operation;
   determining:
      a set of output locations included in the output volume based on the output parameter; and
      based on the resampling operation, for each output location included in the set of output locations, a set of filter weights associated with a set of input locations included in the input volume; and
   including:
      the set of filter weights in a filter vector; and
      the filter vector in the set of filter vectors.

10. The computer-implemented method of claim 9, wherein:
    the input volume comprises at least part of an input image;
    the output parameter comprises at least one of:
       a sampling factor; or
       a target dimension of the output volume;
    the resampling operation comprises an image sampling operation; and
    the output volume comprises a version of the input image sampled in at least one dimension in accordance with the output parameter and the image sampling operation.

11. The computer-implemented method of claim 1, wherein generating the filter bank for the resampling operation is further based on a memory requirement associated with the resampling operation.

12. The computer-implemented method of claim 1, further comprising normalizing the set of filter weights included in each filter vector to a predetermined value.

13. A system comprising:
    a determining module, stored in memory, that determines a set of filter vectors, each filter vector in the set of filter vectors comprising a set of filter weights associated with at least one portion of an output volume of a resampling operation;
    a generating module, stored in memory, that generates, via a clustering algorithm and based on the set of filter vectors, a filter bank for the resampling operation comprising an additional set of filter vectors;
    a transmitting module, stored in memory, that transmits the filter bank to a memory module included in a hardware accelerator;
    a directing module, stored in memory, that directs the hardware accelerator to execute the resampling operation using an input volume and the filter bank; and
    at least one physical processor that executes the determining module, the generating module, the transmitting module, and the directing module.

14. The system of claim 13, wherein:
    the generating module further generates an index of the filter bank that associates each filter vector included in the filter bank with at least one segment of the output volume; and
    the transmitting module further transmits the index of the filter bank to the memory module included in the hardware accelerator; and
    the directing module directs the hardware accelerator to execute the resampling operation using the filter bank further by directing the hardware accelerator to execute the resampling operation using the filter bank and the index.

15. The system of claim 13, wherein the generating module generates, via the clustering algorithm, the filter bank for the resampling operation by:
    determining, in accordance with the clustering algorithm, a representative set of filter vectors for the resampling operation based on the set of filter vectors; and
    including the representative set of filter vectors in the filter bank.

16. The system of claim 15, wherein the generating module identifies, in accordance with the clustering algorithm, the representative set of filter vectors included in the set of filter vectors by:
    partitioning, in accordance with the clustering algorithm, the set of filter vectors into a predetermined number of partitions; and
    for each partition:
       determining a centroid filter vector associated with the partition; and
       including the centroid filter vector associated with the partition in the representative set of filter vectors.

17. The system of claim 16, wherein:
    each filter weight included in each filter vector included in the set of filter vectors is represented in accordance with an initial precision; and
    determining the centroid filter vector associated with the partition comprises:
       determining the centroid filter vector associated with the partition while each filter weight included in each filter vector included in the set of filter vectors is represented in accordance with the initial precision; and
       adjusting a precision of the centroid filter vector to a secondary precision prior to including the centroid filter vector associated with the partition in the representative set of filter vectors.

18. The system of claim 13, wherein the determining module determines the set of filter vectors for the resampling operation by:
    receiving an output parameter for the resampling operation;
    determining:
       a set of output locations included in the output volume based on the output parameter; and
       based on the resampling operation, for each output location included in the set of output locations, a set of filter weights associated with a set of input locations included in the input volume; and
    including:
       the set of filter weights in a filter vector; and
       the filter vector in the set of filter vectors.

19. The system of claim 13, wherein the determining module further normalizes the set of filter weights included in each filter vector to a predetermined value.

20. A non-transitory computer-readable medium comprising computer-readable instructions that, when executed by at least one processor of a computing system, cause the computing system to:
    determine a set of filter vectors, each filter vector in the set of filter vectors comprising a set of filter weights associated with at least one portion of an output volume of a resampling operation;
    generate, via a clustering algorithm and based on the set of filter vectors, a filter bank for the resampling operation comprising an additional set of filter vectors;

transmit the filter bank to a memory module included in a hardware accelerator; and direct the hardware accelerator to execute the resampling operation using an input volume and the filter bank.

* * * * *